United States Patent [19]
McFadden et al.

[11] Patent Number: 5,286,942
[45] Date of Patent: Feb. 15, 1994

[54] INDUCTION STEAM HUMIDIFIER

[75] Inventors: David H. McFadden, Lexington, Mass.; Gorm A. Bressner, Pawtucket, R.I.

[73] Assignee: Arthur D. Little Enterprises, Inc., Cambridge, Mass.

[21] Appl. No.: 782,347

[22] Filed: Oct. 24, 1991

[51] Int. Cl.$^5$ .............................................. H05B 6/10
[52] U.S. Cl. .................................... 219/630; 219/401; 261/142; 392/324
[58] Field of Search ............. 219/10.491, 10.57, 10.75, 219/10.77, 10.51, 401; 392/324, 325; 261/129, 130, 127, 139, 141, 142

[56] References Cited
U.S. PATENT DOCUMENTS

| | | | |
|---|---|---|---|
| 2,494,716 | 1/1950 | McMahon et al. | 219/10.79 |
| 2,622,184 | 12/1952 | Johneas | 219/10.51 |
| 3,215,416 | 11/1965 | Liben | 261/142 |
| 3,578,945 | 5/1971 | Ayres et al. | 219/10.51 |
| 4,013,742 | 3/1977 | Lang | 261/130 |
| 4,341,936 | 7/1982 | Virgin | 219/10.51 |
| 4,560,849 | 12/1985 | Migliori et al. | 219/10.51 |

*Primary Examiner*—Philip H. Leong
*Attorney, Agent, or Firm*—Schiller & Kusmer

[57] ABSTRACT

Apparatus and method for producing steam for humidification of residential and commercial buildings by electrical induction heating of water are disclosed. The apparatus comprises a readily-removable non-magnetic water tank containing a magnetic target in contact with the water and an electrically powered induction coil located outside the water tank but in close proximity to the magnetic target.

26 Claims, 3 Drawing Sheets

INDUCTION STEAM HUMIDIFIER

BACKGROUND OF THE INVENTION

This invention relates generally to a new and improved humidifying/vaporizing apparatus wherein steam is generated by electrical induction heating of water. The use of heating systems, particularly forced hot air systems, during the winter months can result in extremely low indoor humidity levels. It is well-known under such circumstances to provide humidifying/vaporizing apparatus for residential and commercial applications. The purpose of such apparatus is to increase the moisture content of the air in a defined, more or less enclosed location above the normal or ambient humidity. The enclosed location may be a single room or an entire-building.

Numerous benefits are realized by increasing humidity levels of enclosed rooms or buildings heated with forced hot air. For most people, maintaining at least a minimum humidity level in the air makes breathing easier by reducing the drying effect on the lungs and airways, reduces dust and other air-borne particulates, and creates a generally healthier and less disease-prone environment. Energy efficiencies in space heating are also realized because humid air reduces the evaporation (heat loss) from one's skin and as a result allows the reduction in the room's temperature while maintaining comfort. For adults or children with breathing difficulties, such as asthma, bronchitis or croup, sleeping may be almost impossible without a humidifier that raises the humidity of the bedroom substantially above the rest of the house. Both portable and stationary humidifying apparatus are known in the art, as are spot humifiers and those used with central heating systems.

In broad terms, humidifying apparatus can be characterized as either steam-producing or vapor-producing at below boiling point temperatures. The latter types include both water-heating models that operate below boiling point, evaporative pads (rotating or static media) and models that employ ultrasonic mist generation. Numerous contamination problems, however, have severely restricted the use of the below-boiling point humidifiers/vaporizers. Unless the water container is thoroughly cleaned and disinfected almost daily, and a clean, bacteria-free water source is used, bacteria and other infectious organisms will flourish in the warm, moist environment of the water tank and be dispersed into the air along with the water vapor. When such organisms are inhaled, they can lead to serious, even deadly, illnesses such as pneumonia and so-called Legionnaire's disease.

The danger of spreading infectious organisms can be overcome by using steam-producing humidifiers because common micro-organisms are killed by temperatures at the boiling point of water. On the other hand, the steam-producing vaporizers and humidifiers have their own restrictive drawbacks and disadvantages. First, of course, boiling point water and steam have the potential to severely scald human skin, which makes use of these humidifiers around young children especially dangerous. Second, the most common variety of steam-producing humidifier/vaporizer uses an electrical resistance element immersed in a tank of water thereby creating possible electrical shock and fire hazards.

Moreover, such apparatus is often bulky and unwieldy. Even though it may not be necessary for sanitation reasons to clean the water tank of a steam-producing humidifier/vaporizer daily, sediment, inorganic salts, and other common water contaminants will gradually settle out leaving deposits on the floor and walls of the water tank and on the heating element thereby requiring periodic cleaning or replacement of the tank and element. With conventional apparatus, this cleaning or replacement of the water tank can be somewhat difficult and time-consuming.

It is well-known in the art to heat water by the electromagnetic induction process, but this technique has not generally been applied to humidifying/vaporizing apparatus. For example, U.S. Pat. No. 1,513,087 to Buhl et al. and U.S. Pat. No. 1,425,968 to Holmes are directed to induction water heaters. U.S. Pat. No. 1,362,622 to Hendricks describes an electric induction heater for "water, gas, or other fluid." U.S. Pat. No. 2,171,080 to Ely teaches electromagnetic induction apparatus for heating air. U.S. Pat. Nos. 4,341,936 and 4,503,305 to Virgin describe electromagnetic induction systems for heating air or for heating water to produce steam for use in a heating system or to provide motive power. Each of the foregoing electromagnetic induction heating apparatuses is relatively bulky, complicated and unwieldy. For example, in the Buhl et al., Holmes, and Hendricks patents, the water to be heated must be passed from a separate source or holding tank through a system of pipes that are wrapped with electrical coils. Steam generation is not the intended objective of any of these systems, nor is it clear how these systems could be adapted to produce and transmit steam because the steam would interfere with the flow of liquid water through the pipes.

Although the apparatus of the Virgin patents is intended to produce steam from water, the heating and steam production does not occur in the water tank but rather in a separate chamber filled with magnetizable ball bearings and externally wrapped in electric induction coils. Cleaning or replacing the separate heating chamber and the hundreds of ball bearings inside would be an expensive and tedious process. Cleaning and sanitization, however, are not problems with the Virgin apparatus because the steam remains contained in a closed system and is condensed back to water vapor for recycling. The Virgin apparatus is intended for heating purposes, not for humidification. In the Virgin patents, steam and/or water vapor is not dispersed into air that will be used for breathing.

U.S. Pat. No. 4,013,742 to Lang, by contrast, is directed to humidifying and heating apparatus for respiratory gas utilizing electromagnetic induction for heating the humidifying liquid. The Lang apparatus comprises a first unit for generating electromagnetic energy and a second unit for holding and heating the humidifying fluid and adapted to be positioned in a particular configuration with respect to the first unit during operation. The second unit contains a flanged ferromagnetic plate in close proximity to the induction coils of the first unit when the two units are in operating configuration, thereby resulting in inductively heating the flanged plate and the fluid in the second unit. The apparatus of the Lang patent, however, is relatively complex, delicate, expensive to manufacture in requiring numerous precision-machined parts, and intended for very specialized applications in conjunction with hospital respirators for use with premature infants, heart surgery patients and the like. The Lang apparatus is clearly intended to humidify only a relatively small steam of respiratory gas, not an entire room or building. Moreover, the Lang apparatus is intended for use under conditions where there is continual and frequent monitoring by trained professionals. The Lang patent also recognizes the need to periodically clean the fluid-holding unit if it is to be re-used (col. 4, 11. 25-28). Although steam can be generated for sterilizing purposes using the Lang apparatus, (col. 4, 11. 35-39), it is clear that, in normal operation, it is not intended to run this apparatus at boiling point temperatures. Moreover, it is clear that Lang intends the fluid-holding unit to be cleaned and re-used because this is an expensive, precision-crafted component. The fluid-holding unit in Lang includes inlet and outlet valves, internal tubes and baffle plates, and the ferromagnetic plate all as integral components. Even assuming that the interior of Lang's fluid-holding unit could be easily accessed and the component parts removed for cleaning and re-use, such a procedure would be costly, labor-intensive and time-consuming. Clearly, then, Lang's fluid-holding unit is not intended to be disposable.

These problems with the prior art devices as well as others discussed below are overcome in whole or in part by the apparatus and method of this invention.

OBJECTS AND SUMMARY OF THE INVENTION

Accordingly, it is a principal object of this invention to provide humidifying/vaporizing apparatus for residential and commercial buildings in which steam is produced by induction heating of water.

It is also an object of this invention to provide humidifying/vaporizing apparatus in which no current-carrying electrical elements are in contact with water.

A further object of this invention is to provide humidifying/vaporizing apparatus in a compact, modular form having a readily removable and disposable water tank.

Still another object of this invention is to provide humidifying/vaporizing apparatus together with a method of using and regulating such apparatus.

These and other objects of the present invention are directed to an apparatus for and method of producing steam for humidification of residential and commercial buildings by electrical induction heating. The apparatus comprises a readily-removable non-magnetic water tank containing a magnetic target in contact with the water and an electrically powered induction coil located outside the water tank but in close proximity to the magnetic target.

Other objects of the present invention will in part be obvious and will in part appear hereinafter. The invention accordingly comprises the apparatus possessing the construction, combination of elements, and arrangement of parts, and the processes involving the several steps and the relation and order of one or more of such steps with respect to each of the others, exemplified in the following detailed disclosure and the scope of the application all of which will be indicated in the claims.

BRIEF DESCRIPTION OF THE DRAWINGS

For a fuller understanding of the nature and objects of the present invention, reference should be had to the following detailed description taken in connection with the accompanying drawings wherein.

DETAILED DESCRIPTION OF THE INVENTION

Figure 1:
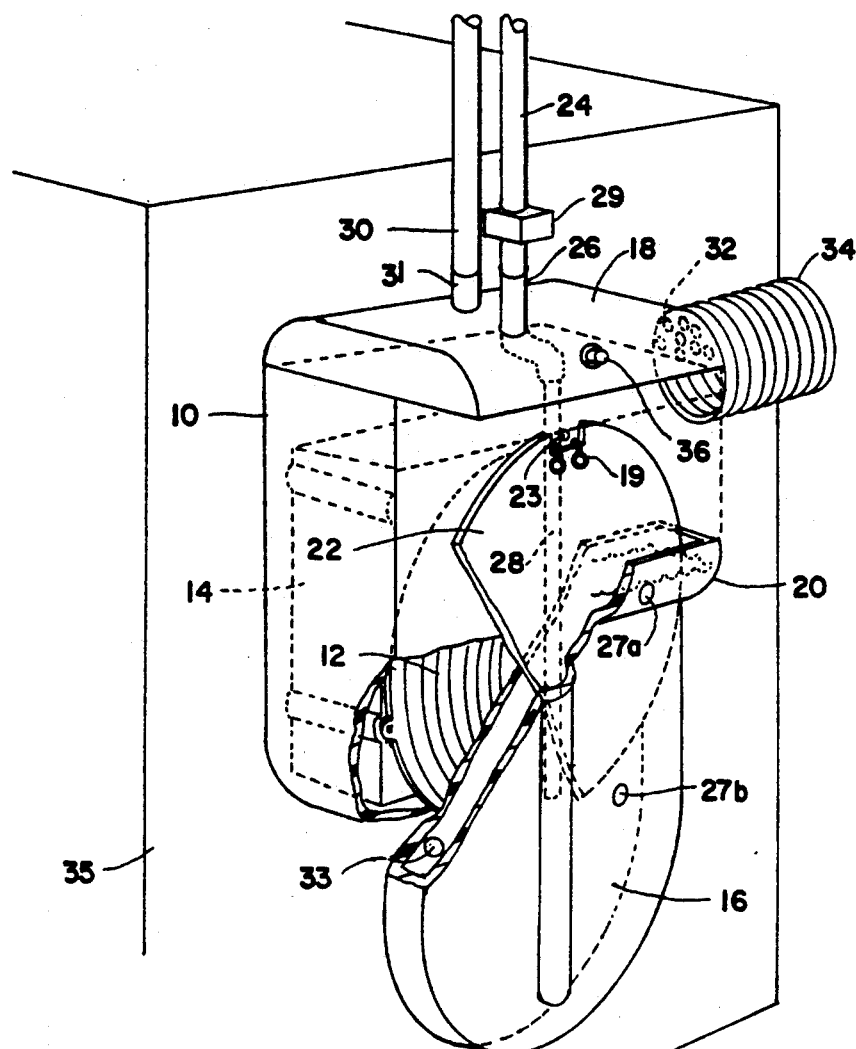
FIG. 1 is a schematic perspective view of one embodiment of the apparatus of this invention partially cut away to show selected interior sections of the humidifier/vaporizer.

FIG. 1 shows a partially cut-away view of the induction steam humidifier comprising generally housing means 10 for housing the electromagnetic induction coil 12 and the electronic control system 14. The coil 12 and the electronic control system 14 can be a commercially available unit, such as The Sears and Roebuck induction cooktop with induction modules made by Sanyo as the top surface induction heating elements and controls of commercially available stoves utilizing such heating elements. The humidifier further comprises tank means 16 for holding a humidifying fluid such as water; and hood means 18 for containing and directing humidifying vapors produced by this system. Tank means 16 comprises a fluid chamber with an opening or mouth at the top thereof defined by a lip or edge 20 designed to engage and mate with hood means 18 so as to completely cover and seal the fluid chamber opening to prevent the escape of steam from the unit when it is in use.

A ferromagnetic target 22 is suspended either from hood 18 or from one outside face of housing 10 by suitable means 19 (such as a latch or the like) such that it can be readily detached therefrom, cleaned, and replaced. In a preferred embodiment, target 22 is a nickel-coated steel disk. Target 22 is positioned such that it is located outside housing 10 but in close proximity to induction coil 12. In addition, target 22 is so positioned and is of such size and shape that it is completely enclosed by tank 16 when lip 20 thereof is mated with hood 18 as described above. In the preferred embodiment, when properly positioned no part of target 22 contacts any inner surface of tank 16 when the tank is in position, and substantially all of target 22 is covered with humidifying fluid when tank 16 is full. A sensor 23 can be provided as a part of latch 19 in order to sense whether the target is properly mounted relative to the system.

In one embodiment of the invention as illustrated in FIG. 1, tank 16 has a substantially U-shaped frontal cross-sectional configuration with lip 20 running across the top of the "U". Target 22 is generally a flat plate substantially circular or U-shaped and of smaller dimensions than tank 16 so as to fit completely inside. In this embodiment, induction coil 12 is wound in a flat generally circular configuration of a size and shape corresponding to target 22 and oriented in a plane substantially parallel to the plane of target 22 but spaced a short distance therefrom in order to maximize the efficiency of the induction operation. Fluid inlet means 24 connects through a vapor-tight fitting 26 in hood 18 to fluid snorkle means 28 that extends into tank 16 when lip 20 thereof is mated with hood 18. Fluid inlet means 24 allows tank 16 to be either continuously, periodically or intermittently refilled while the apparatus is in operation. Preferably, two sensors 27a and 27b, such as float sensors, can be provided to detect two fill lines in the tank. More specifically, one sensor 27a senses when the water in the tank reaches a predetermined minimum level and provides a signal so as to open a valve 29 provided in fluid inlet means 24 when the sensor detects the minimum water level (and thus avoids the water level in the tank from getting too low and thus the target overheating). The second sensor 27b indicates when the incoming water from fluid inlet means has filled the tank and provides a signal so as to close the valve 29 when the water level is at its maximum. A third sensor 33 can be provided for sensing the temperature of the wall of the tank at least at one location in order to insure that the tank does not overheat.

Electrical conduit means 30 provides electrical access through fitting 31 into housing 10 to the electronic control system 14. The external electrical power source can be either AC or DC depending upon the system 14. Alternatively, for some applications, it is envisioned that an internal electrical source (e.g. a battery housed within housing 10) could be substituted for the external power source, in which case conduit 30 could be eliminated.

Hood 18 further comprises vapor outlet means such as apertures 32 to vent steam (or other vapor) from inside hood 18 to the outside environment or to another location and it prevents the liquid drops from leaving tank 16 during boiling (mist elimination). Conduit means 34 attached to the outer face of hood 18 and in communication with apertures 32 can be used to direct the vapor in a particular direction or to exhaust the vapor at a point away from the outer faces of hood 18 and housing 10 to avoid possible condensation on and resulting corrosion of the apparatus. Preferably, conduit 34 is connected to a return duct of a central heating system so that humidity is added to air being returned to the heated space(s) served by the heating system. A switch 36 located on the outer face of hood 18 or housing 10 can be used to turn the apparatus on and off. Also as shown in FIG. 1, the apparatus of the invention can be mounted on a wall (such as the wall 35 of a furnace or heat pump as shown in FIG. 1) or any other vertically-extending surface. Using conventional methods, such mounting can be permanent or, alternatively, the entire apparatus can be readily removably supported by the fittings that connect the fluid inlet means and electrical conduit means. The apparatus should be mounted far enough above the floor, table top or other horizontal surface so that tank 16 can be readily detached from hood 18, and easily dropped below, free and clear, of target 22, so that the used tank can be replaced by a new or a cleaned and sterilized tank.

Figure 2:
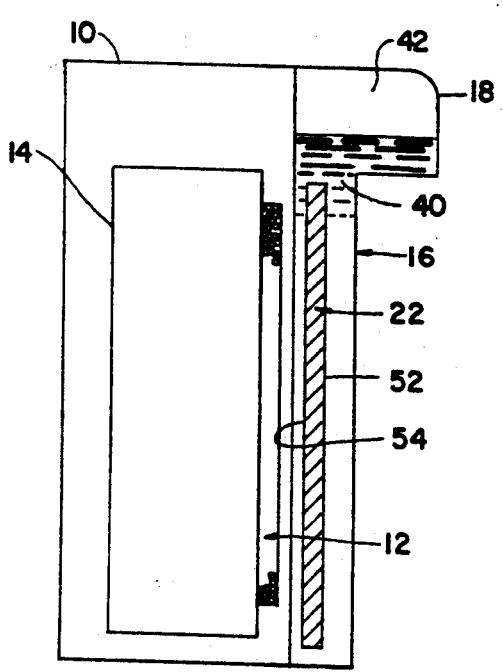
FIG. 2 is a cross-sectional view of one embodiment of the apparatus of this invention showing the source of electromagnetic energy located outside the water tank but in close proximity to a magnetic target located inside the water tank.

FIG. 2 is a cross-sectional view better showing the design and spacing of the components of the induction steam humidifier. As described above, electronic drive system 14 and electromagnetic induction coil 12 are housed in a protective shell or housing 10. In one embodiment of the invention as illustrated in FIG. 2, tank 16 is of a generally inverted L-shaped side cross-sectional configuration and is filled with water or another humidifying fluid 40. The short arm portion of the L-shaped tank 16 mates with hood 18 so as to contain the steam or other vapor 42 produced in accordance with this invention. The steam produced by the apparatus of this invention can be introduced into residential or commercial buildings in a central or spot fashion. The long arm portion of the L-shaped tank 16 is of relatively narrow width and is filled with humidifying fluid 40. Target 22 is so positioned in the long arm section of L-shaped tank 16 that its front face 52, rear face 54, sides, top and bottom are all surrounded by and in contact with the humidifying fluid. Moreover, target 22 is positioned such that rear face 54 is close to, but not touching, the inner rear face of tank 16 in order to have the target 22 located as close as possible to induction coil 12 while still fully in contact with the humidifying fluid.

The width of the long arm section of the L-shaped tank 16 and, accordingly, the fluid capacity of tank 16 are functions of the electromagnetic induction heating capacity of the apparatus. If there is too much fluid in tank 16 for the size and power of coil 12, it will be difficult or impossible to bring the fluid to a boil for steam/vapor generation in a short time period. But selection and adjustment of the parameters of tank size and shape, target size, coil size, and power supply to suit a particular humidifying application are routine matters of choice well within the ability of one skilled in the art.

Figure 3:
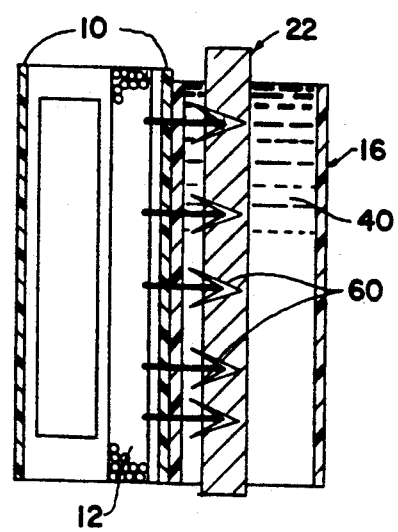
FIG. 3 is an exploded cross-sectional view of a portion of the apparatus shown in FIG. 2 illustrating how electromagnetic energy heats the target inside the water tank.

FIG. 3 is an exploded cross-section of the apparatus of FIG. 2 illustrating how electromagnetic energy designated by arrows 60, generated by coil 12, passes through the outer face of non-magnetic housing 10, through the rear face of tank 16, and creates eddy currents in target 22 resulting in heating the latter which, in turn, heats the surrounding humidifying fluid 40. In order to prevent or minimize power loss and interference with the electromagnetic induction process and for easy handling of the tank after the system has been operating, it is preferred that housing 10 and tank 16 be made of plastic or other non-ferrous, non-magnetizable materials. It is also preferred that the walls of housing 10 and tank 16 be kept as thin as possible, consistent with structural integrity, to minimize power losses.

Figure 4:
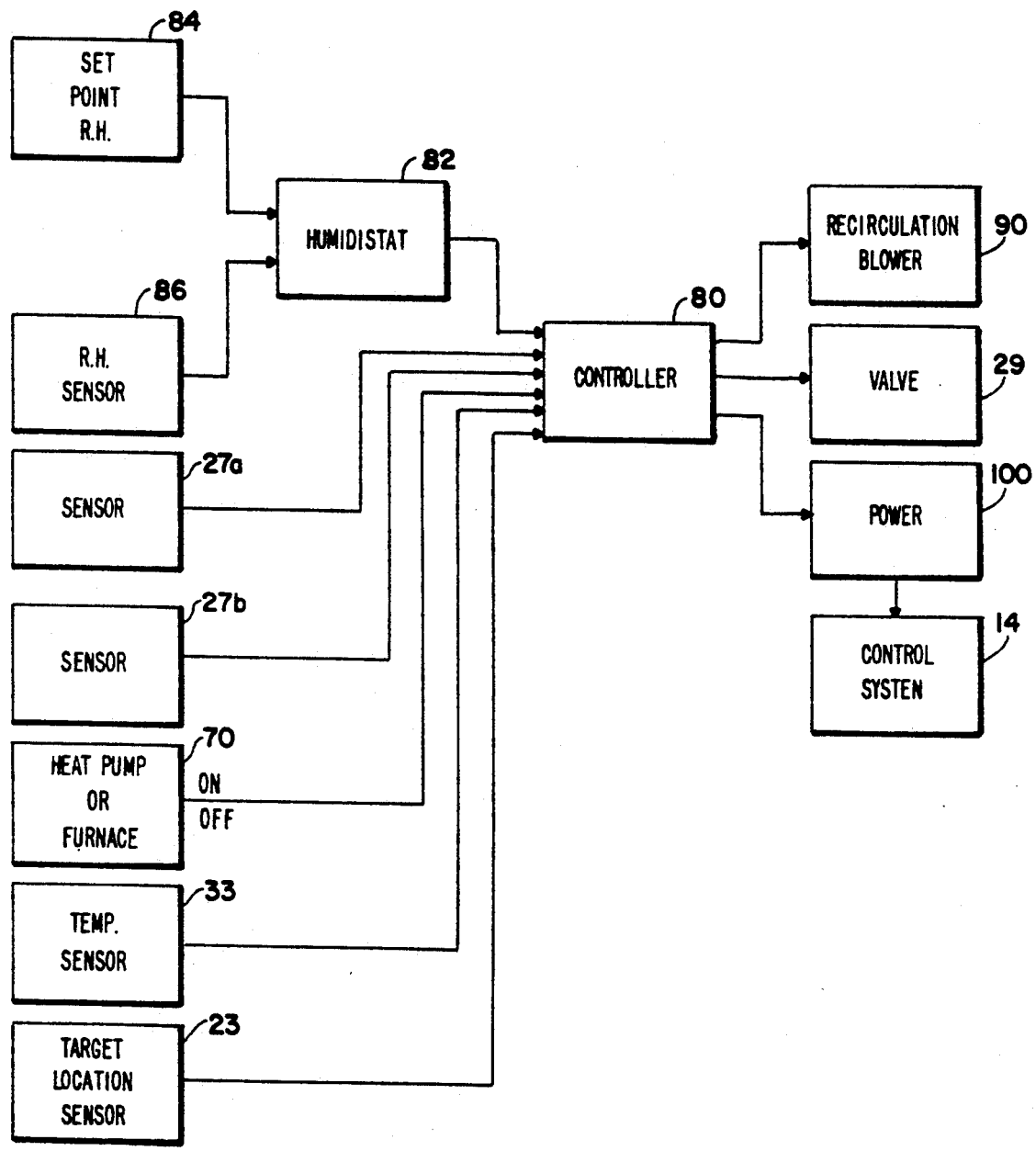
FIG. 4 is a block diagram of the essential elements for operating the preferred humidifier system of the present invention.

In FIG. 4 the block diagram shows the system connected for operation with a heat pump or furnace 70 with the conduit 34 connected to the return of the central heating duct serviced by the furnace. Specifically, the central controller 80 of the system is connected to detect whether the furnace 70 is on or off. Controller 80 is also connected to detect the output of the target location sensor 23, the water level sensors 27a and 27b, the tank wall temperature sensor 33 and the output of a humidistat 82 connected to measure the difference between the relative humidity set point 84 (set by the operator of the system) and a sensor 86 for sensing the actual relative humidity. The controller 80 senses the outputs of these devices so that it can control the recirculation blower 90 positioned to draw air through the return duct, the valve 29 and the power switch 100 of the control system 14. Controller 80 can include means for turning the electronic control system 14 off, if the tank fails to fill up within a predetermined period of time when the sensors 27b sense a low water level, and instructs the controller 80 for the latter to open valve 29. For example, a timer can be provided to detect the outputs of both sensors 27a and 27b and provide a disabling signal to power switch 100 should the timer fail to receive the signal from sensor 27b following a predetermined time period after receiving the signal from sensor 27a.

Figure 5:
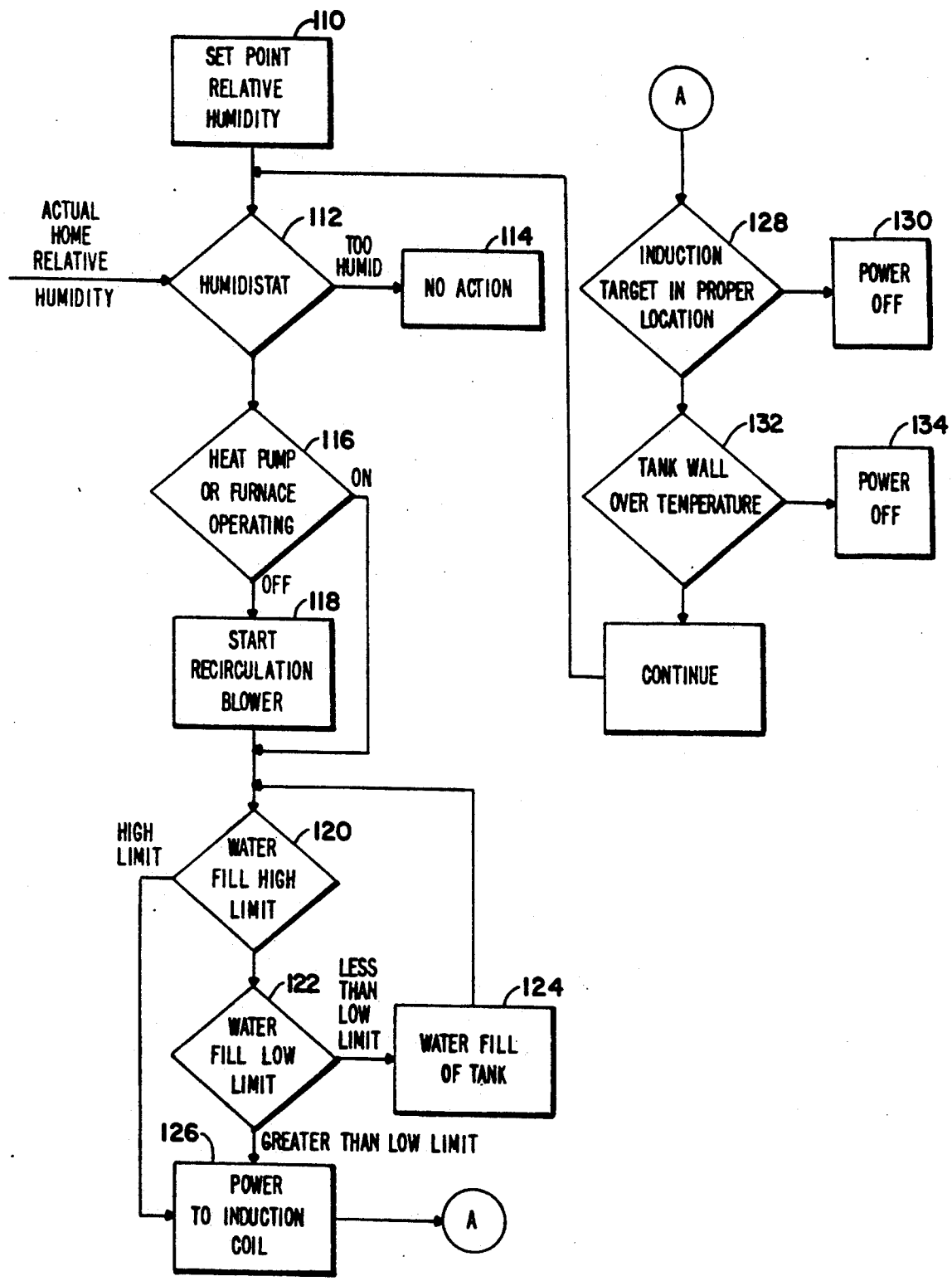
FIG. 5 is a flow chart illustrating how the apparatus of this invention can be beneficially regulated for automatic start-up and shut-off with a central heating system and the water tank maintained with sufficient water.

FIG. 5 is a flow chart illustrating the operation of the embodiment of humidifying apparatus of this invention based on the block diagram configuration shown in FIG. 4. Specifically, as shown at 110 of FIG. 5, the set point relative humidity setting 84 is compared to the actual home relative humidity sensed by sensor 86 by the humidistat 82 as indicated at 112. If the air is too humid (the actual relative humidity is higher than the setting) no action is taken as seen at 114. If not humid enough, the humidistat provides a signal to the controller 80, which in turn senses whether the furnace 70 is on or off at step 116. If off, the recirculation blower 90 is turned on at step 118, with the controller then proceeding to step 120. If on, the controller proceeds directly to step 120, wherein the high water level sensed by sensor 27a is at the high water level. If yes, the controller can next proceed directly to step 126. If no, the controller proceeds to step 122 to determine whether the water level is below the minimum level detected by sensor 27b. If yes, the tank needs refilling, which occurs at 124 (with the controller 80 opening valve 29), with sufficient time being provided to fill the tank. The controller repeats step 120 and if necessary step 122 to be sure the tank is filled. The timer in controller 80 will prevent the controller from going through an endless loop should the tank fail to fill. Once the tank is filled, the controller proceeds to step 126 where the controller 80 turns the power switch 100 to the control system 14. The controller proceeds through the checking tests 128 and 132 to determine respectively, whether the target is properly positioned, as sensed from sensor 23, and whether the tank wall temperature as sensed by sensor 33 has exceeded a predetermined level. If yes to either, the power switch 100 is turned off as indicated by steps 130 and 134. If both tests are satisfactory, the controller continually repeats steps 112 through 132 until a failure is indicated or the device is turned off by independently disconnecting the power.

Because the apparatus of this invention employs a readily removable fluid tank that is completely separate from and independent of all other system components, this invention facilitates cleaning or replacement of the fluid tank to remove sediment, deposits, or any other contaminants. In particular, the only part of this humidifying system that is physically attached to or connected with the fluid tank is hood 18, and even that connection is just to the mouth or lip 20 of tank 16 and, in any event, is readily removable. Not even target 22 is physically connected to or in contact with tank 16 in any way.

This is in sharp distinction to prior art patents, such as Lang—U.S. Pat. No. 4,013,742—as discussed above, which have various critical components, including inlet/outlet valves, baffles, and the target, constructed integral with the fluid tank or heating chamber. This makes it difficult and time-consuming to thoroughly clean the fluid tank and the internal components because scrub brushes and rinse fluids cannot access all of the interior of the tank. A steam treatment, as taught by Lang, may effectively sterilize the tank interior but may not remove hard scale or crust from the interior walls of the tank, the baffles, or the target plate. Furthermore, because the apparatus of this invention employs a plastic fluid tank of simple design and construction, the tank need not be cleaned at all but rather can be disposed of and inexpensively replaced with a new tank. Once again, this feature is in sharp contrast to the prior art where precision-crafted design and integration with other expensive components makes the fluid tanks or heating chambers too costly to be disposable in most ordinary humidification applications.

Since certain changes may be made in the above-described processes and products without departing from the scope of the invention herein involved, it is intended that all matter contained in the above description shall be interpreted in an illustrative and not in a limiting sense.

What is claimed is:

1. A humidification apparatus comprising, in combination:
   (a) induction coil means for producing electromagnetic energy;
   (b) target means, spaced apart from and fixed relative to said induction coil means, for producing heat in response to electromagnetic energy produced by said induction coil means sufficient to vaporize a humidifying fluid in contact therewith so as to produce a vapor;
   (c) fluid holding means for containing a humidifying fluid, said fluid holding means comprising a chamber having interior surfaces that define said chamber, and an opening for receiving said humidifying fluid and said target, and for providing an outlet for said vapor created in said chamber, said chamber being sized so as to enclose said target means such that said target means is spaced from and independent of said interior surfaces of said chamber so that the portion of said target means disposed in said chamber can be completely immersed in said humidifying fluid when said chamber is filled with said humidifying fluid;
   (d) hood means for containing and directing vapor provided from the top of said chamber; and,
   means for holding said fluid holding means relative to said hood means so that said opening is disposed in fluid communication with said hood means, and for releasing said hood means relative to said fluid holding means so that said fluid holding means can be replaced.

2. The apparatus of claim 1, wherein said humidifying fluid is water and said vapor is steam.

3. The apparatus of claim 1, further wherein said induction coil is enclosed by a housing comprising an inner and an outer housing wall.

4. The apparatus of claim 3, wherein said housing is plastic.

5. The apparatus of claim 1, wherein said fluid holding means is plastic.

6. The apparatus of claim 1, wherein said induction coil means comprises a flat, generally circular configuration of electrical wiring.

7. The apparatus of claim 6, wherein said target means comprises a generally ar ferromagnetic plate.

8. The apparatus of claim 1, wherein said hood means further comprises fluid inlet means.

9. The apparatus of claim 8, wherein said fluid inlet means comprises a vapor-tight fitting and a fluid conduit extending through said opening into said chamber.

10. A humidifying apparatus comprising:
   (a) electromagnetic induction heating means for heating a humidifying fluid so as to produce a humidifying vapor, said heating means comprising an induction coil for producing electromagnetic energy, and a target, spaced from said coil in a fixed spaced relationship, for heating fluid in contact with said target in response to electromagnetic energy produced by said coil;

(b) vapor containment means for containing said vapor produced when said humidifying fluid is heated by said target; and (c) a fluid container, wherein said container is slidable on and fixedly attachable relative to said target and comprises means for defining a chamber completely enclosed by chamber walls except for an opening in the top thereof, said chamber being sized and shaped so that (i) said opening receives said target as said fluid container is slid onto said target and fixed relative to said target, said heating means and said vapor containment means so that said opening is disposed in tight fluid communication with said vapor containment means and so that said fluid container is supported in order that said target and chamber walls are in non-contacting relationship such that the portion of said target in said chamber is completely surrounded by said humidifying fluid when said chamber is fixed relative to said target and said heating means, and said chamber is filled with humidifying fluid.

11. The apparatus of claim 10, further wherein said fluid container comprises a mouth of a size and shape such that said target readily passes through said mouth.

12. The apparatus of claim 10, wherein said vapor containment means includes a hood disposed above and releasably sealed with respect to said opening of said chamber in order to receive vapors from said fluid container when said fluid container is fixed relative to said target, said induction means and said vapor containment means.

13. The apparatus of claim 10, wherein said humidifying fluid is water and said vapor is steam.

14. The apparatus of claim 10, wherein said target is a nickel-coated steel disk.

15. The apparatus of claim 10, wherein said fluid container is plastic.

16. The apparatus of claim 10, wherein said induction coil and said target are of substantially flat, circular configuration disposed in generally parallel planes.

17. The apparatus of claim 16, further wherein at least a portion of said fluid container is of a generally flat, U-shaped configuration that surrounds said target.

18. For use in a forced hot air heating system of the type including a return air duct through which forced hot air is conducted, an improved humidification system for increasing the relative humidity of said forced hot air, said humidification system comprising:

(a) induction coil means for producing electromagnetic energy;

(b) target means, spaced from said induction coil means, for producing heat in response to electromagnetic energy produced by said induction coil means sufficient to vaporize a humidifying fluid in contact with said target means;

(c) support means for supporting said target means relative to said induction coil means so that said target means remains a fixed distance from said coil means;

(d) hood means, positioned with respect to said support means to that said hood means is fixedly disposed above said target means, for containing vapor from said humidifying fluid heated by said target means so that said vapor can be directed to the return air duct; and (e) fluid holding means, defining a fluid holding chamber including an opened top, for receiving and containing said target means and a humidifying fluid in contact with said target means, and including attachment means for releasably attaching said fluid holding means relative to said support means so that said opened top is disposed below said hood means;

wherein said chamber and said target means are sized and shaped so that said fluid holding means is slidable onto said target means such that said target means extends through said opened top into said chamber when securing said fluid holding means relative to said target means with said attachment means, and is slidable off said target means when releasing said fluid holding means relative to said support means.

19. The humidification system according to claim 18, further including fluid supply means for supplying said humidifying fluid to said chamber.

20. The humidification system according to claim 19, wherein said fluid supply means includes an input line fixed relative to said support means so that said input line extends through said opened top into said chamber spaced from said target means when said fluid holding means is attached relative to said support means.

21. The humidification system according to claim 20, further including sensing means for sensing minimum and maximum levels of humidifying fluid in said chamber.

22. The humidification system according to claim 21, further including control means for controlling said fluid supply means in response to said sensing means so that said fluid supply means supplies said fluid when said sensing means senses the fluid in said chamber is at said minimum level, and turns off the supply of said fluid when said sensing means senses the fluid in said chamber is at said maximum level.

23. The humidification system according to claim 18, wherein said target means includes a disk made of material which produces heat in response to electromagnetic energy, and shaped and sized so that no part of said disk contacts the side of said chamber when said fluid holding means is secured relative to said target means with said attachment means.

24. The humidification system according to claim 23, wherein said chamber is shaped and sized so that said target means, when secured relative to said target means, is substantially covered by said humidifying fluid when said chamber is filled with said fluid.

25. The humidification system according to claim 18, further including conduit means coupled to said hood means for directing vapor contained in said hood means to said return air duct.

26. The humidification system according to claim 25, wherein said hood means includes aperture means for providing fluid communication between said hood means and said conduit means so that vapor directed from said hood means to said return air duct passes through said aperture means.

* * * * *

UNITED STATES PATENT AND TRADEMARK OFFICE
CERTIFICATE OF CORRECTION

PATENT NO. : 5,286,942
DATED : February 15, 1994
INVENTOR(S) : David H. McFadden and Gorm A. Bressner It is certified that error appears in the above-indentified patent and that said Letters Patent is hereby corrected as shown below:

Claim 7, column 8, line 56, delete "ar ferromagnetic" and subsitute therefor -- circular ferro-magnetic --.

Signed and Sealed this

Twenty-first Day of June, 1994

Attest:

BRUCE LEHMAN

Attesting Officer        Commissioner of Patents and Trademarks